Patented Jan. 2, 1934

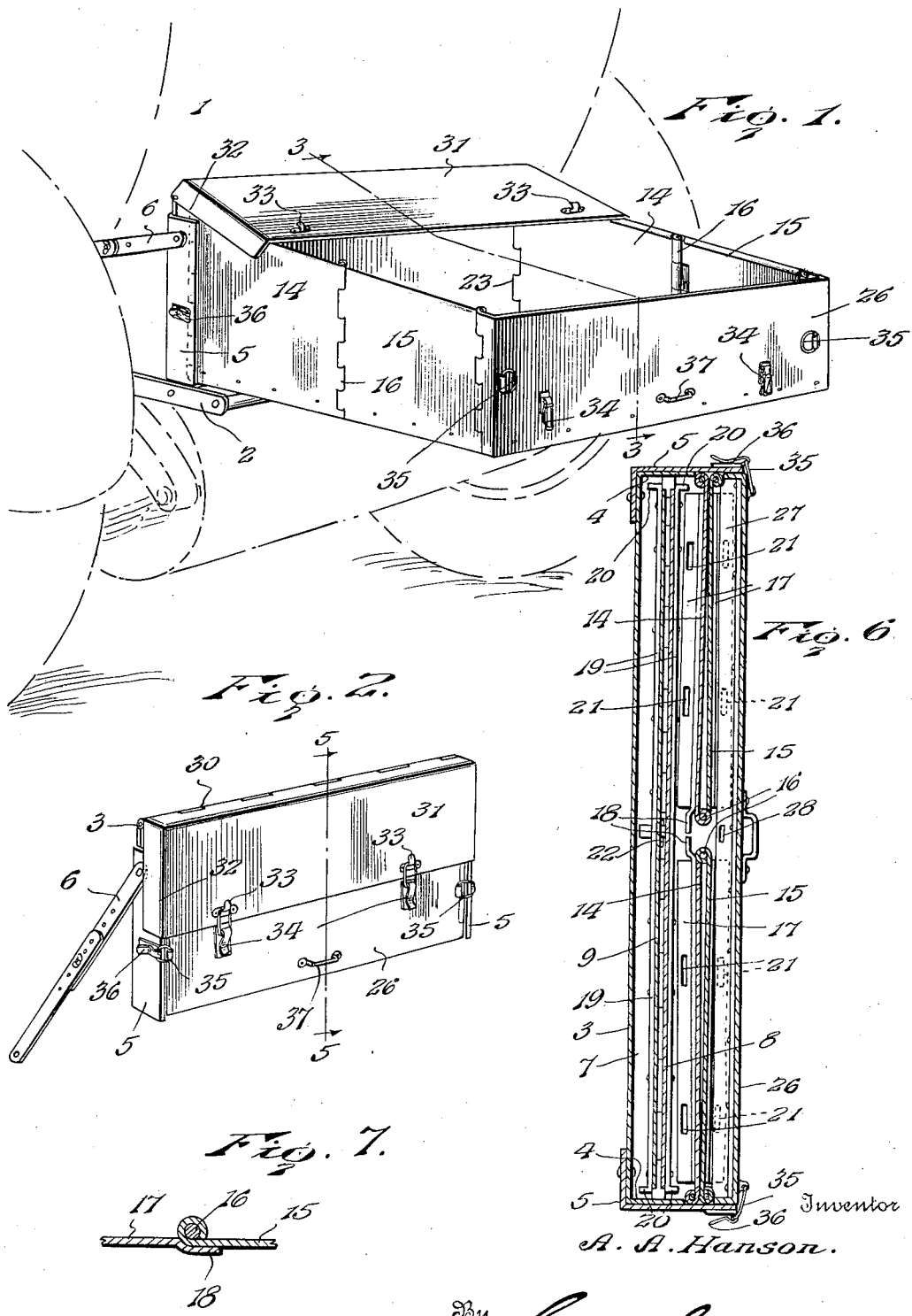

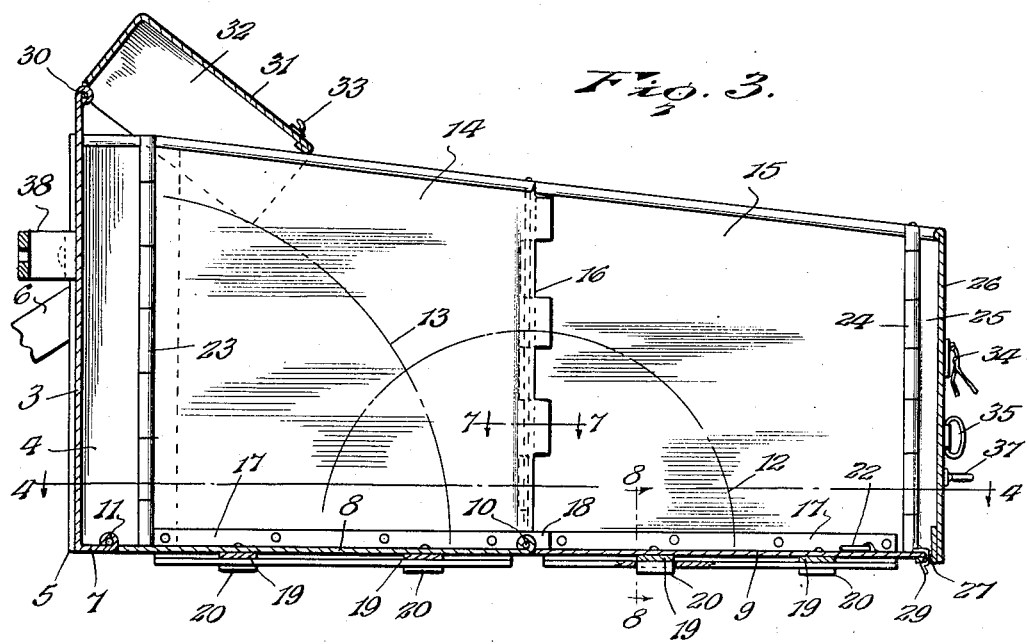

1,941,860

UNITED STATES PATENT OFFICE 1,941,860

AUTOMOBILE TRUNK

Arden A. Hanson, Oakland, Nebr.

Application May 2, 1932. Serial No. 608,782

6 Claims. (Cl. 224—29)

The object of this invention is to provide a trunk or luggage carrier for attachment to an automobile of such construction that it may be folded into a very compact space when not in use and when its use is desired may be extended so as to provide a holder or carrier of considerable capacity. The invention provides a collapsible trunk or carrier which may be very easily extended for use and just as readily collapsed into a small compass and secured in the folded position so as to be firmly held against accidental opening. The invention is illustrated in the accompanying drawings and will be hereinafter first fully described and then more particularly defined in the appended claims.

In the drawings, Figure 1 is a perspective view of a trunk or carrier embodying the invention and in the extended position, Fig. 2 is a similar view showing the device folded as it is disposed when not in use, Fig. 3 is an enlarged longitudinal vertical section on the line 3—3 of Fig. 1, Fig. 4 is a horizontal section on the line 4—4 of Fig. 3, Fig. 5 is a vertical section on the line 5—5 of Fig. 2, Fig. 6 is a horizontal section on the line 6—6 of Fig. 5, Fig. 7 is an enlarged detail section on the line 7—7 of Fig. 3, Fig. 8 is a detail vertical section on the line 8—8 of Fig. 3.

In the drawings, the reference numeral 1 indicates a portion of a motor vehicle which may be of any approved or known type and is equipped with a trunk rack or support 2 at its rear end.

The trunk or carrier embodying the present invention comprises a front plate 3 which is preferably of sheet metal and rectangular in outline and may be of any desired dimensions. The vertical end edges of the front plate are bent rearwardly, as shown at 4, to form side flanges to which the side members of the trunk are hinged. To reinforce the structure, outer angle plates 5 are secured to the end portions of the front plate and extend around the corners of the same with their side portions projecting somewhat beyond the edges of the flanges 4, as shown in Figs. 4 and 6. The trunk is intended to rest upon the trunk rack 2, as shown in Fig. 1 and as will be understood, and, to secure the trunk firmly in its place, extensible braces or connecting bars 6 are provided which, as shown in Figs. 1 and 2, consist of two similar flat bars or metal straps which are adjustably or telescopically connected at their meeting ends whereby the effective lengths of the straps or bars may be regulated, the upper ends of the connecting bars being pivoted to the end reinforcing plates 5 and the opposite ends thereof being secured to some fixed part of the vehicle. At the lower edge of the front plate or wall 3 is provided a rearwardly extending flange 7 which is of less extent than the side flanges 4 and to which the bottom of the trunk is attached. The bottom of the trunk or carrier consists of two plates 8 and 9 which are connected at their meeting edges by a hinge 10 which will permit the plates to be folded one upon the other or to be extended in a horizontal plane, as will be understood upon reference to Figs. 3 and 5. The front plate 8 is connected by a hinge 11 to the rear edge of the flange 7 so that it may be swung to a position extending horizontally rearward or swung to a position rising from the flange and spaced from the front wall. When the plate 8 is extended rearwardly, the plate 9 is disposed in the same plane therewith, as shown in Fig. 3, but, when the trunk is to be collapsed, the plate 9 is swung over upon the plate 8, as indicated by the arrows 12, and the plate 8 is then swung up into the position shown in Fig. 5, as indicated by the arrows 13 in Fig. 3, the upward movement of the plate 8 causing the plate 9 to assume a position between said plate 8 and the front wall of the trunk, as clearly shown in Fig. 5. The sides of the trunk each consist of a front plate 14 and a rear plate 15 which are connected at their meeting edges by hinges 16 which are so located that, when the trunk is extended, the hinges 10 and 16 will be alined, as shown clearly in Figs. 3 and 4, and the hinges 16 are so arranged that the side members 14 and 15 cannot move at their meeting edges outwardly beyond the planes of the respective sides of the trunk but may move inwardly when the trunk is to be collapsed. Along the lower edges of the side plates 14 and 15, and on the inner faces thereof, I secure angle bar strips 17 which serve to reinforce the side plates and resist buckling of the same and the front angle bar has its rear end extended beyond the joint between the plates, as shown at 18, whereby it is adapted to overlap the front end of the meeting angle bar and thereby prevent the excessive outward movement of the plates at their hinge connection while permitting inward movement of the same when the trunk is to be collapsed. The bottom plates 8 and 9 are provided, upon those surfaces which are the bottom surfaces when the trunk is extended, with reinforcing straps 19 the ends of which are turned downwardly, as show at 20, to engage through slots 21 provided in the angle bars 17 whereby the side members will be held together and prevented from yielding outwardly under pressure from articles placed within the trunk. In extending the trunk for use, the side members are moved into the extended operative position and the bottom plates are then swung outwardly so that they pass downwardly between the side plates and the ends or hooks 20 pass automatically into proper engagement with the slots 21. A ring or other form of handle, indicated at 22, is provided upon the plate 9 to facilitate the upward movement of the same when the trunk is to be collapsed.

The front side plate 14 is connected to the edge of the side flange 4 by a hinge 23 corresponding to the hinges 16 and it may be noted that all of the hinges consist of alined hinge eyes or sleeves on the meeting members and pintles or hinge pins inserted through the sleeves. At the rear edges of the rear side plates 15, similar hinges 24 are provided to connect said side plates with side flanges 25 on the rear plate or wall 26 which forms the closure for the rear end of the trunk when it is in use. It should be noted that the upper edges of the side plates and the upper edge of the back plate or wall 26 incline downwardly from the ends of the flanges 4 so that the placing of articles within the trunk will be facilitated and the several parts will cooperate to accommodate each other when the trunk is collapsed. At the lower edge of the back plate or wall 26 is a flange 27 which may be a reinforcing angle bar riveted or otherwise secured to the back plate and this flange is provided, at intervals, with openings 28 therethrough to be engaged by spring latches 29 on the free edge of the bottom plate 9 so that the parts will be firmly held together when the trunk is extended for use.

Attached to the upper edge of the front plate or wall 3, by hinges 30, is a cover 31 which is of proper form and dimensions to fit over the upper edges of the bottom plates and the side and rear plates when the trunk is folded, as shown in Fig. 5, this cover or hood having end flanges 32 which overlap the upper portions of the side plates 5 and thereby entirely cover the upper portions of the different foldable members. The cover 31 is provided with lugs 33, adjacent its free edge, with which may be engaged clasps 34 on the rear plate 26 so that the trunk will be firmly fastened in its collapsed form, and, for the same purpose, cooperating fastening elements 35 and 36 are provided on the back plate, adjacent the ends thereof, and on the end plates 5. A handle 37 of any convenient or approved form is provided on the rear plate 26 to facilitate the manipulation of the same.

From the foregoing description, taken in connection with the accompanying drawings, it will be seen that I have provided a very efficient trunk or carrier which may be readily extended at the rear of an automobile or may be folded into very compact form and secured in the collapsed condition. When in the collapsed condition shown in Fig. 2, it will present a very neat appearance and, when extended, will be adapted to hold and carry bulky articles without liability of the same being jolted out of the holder and thereby lost. When the trunk is to be used, the cover 31 is released and lifted sufficiently to permit the rear plate or wall 26 to be drawn rearwardly, the edge of the cover then riding upon the upper edges of the back wall and the side walls and the side wall members being automatically drawn out and extended in alinement in the positions shown in Figs. 1, 3 and 4. The bottom plates are then swung rearwardly and downwardly successively so as to assume the positions shown in Figs. 3 and 4, and the bracing straps 19 will automatically engage in the rails or braces 17, as described, so as to retain the parts in the proper relation. The latches 29 will also automatically engage the flange 27 at the lower edge of the back wall for the same purpose. When the trunk is to be collapsed, the parts are moved in the reverse directions and in the reverse order so as to assume the positions shown in Figs. 5 and 6, the cover being then swung downwardly and fastened, as shown in Fig. 2. The trunk can be very easily manipulated and can be produced at a cost which will permit its installation on all cars. Preferably, the trunk will be located upon the trunk rack in such relation to the vehicle that a spare tire or wheel may be disposed between the trunk and the back of the vehicle, although this particular arrangement is not necessary. As it is a very convenient arrangement, however, I have indicated a spare tire carrier 38 as provided upon the front wall 3 of the trunk upon which the spare tire or wheel may be mounted.

Having thus described the invention, I claim:—

1. A carrier for attachment to a vehicle comprising a front wall, hingedly connected side walls having their front ends hingedly attached to the front wall, angle bars secured to the lower edges of the side walls and provided with spaced slots, a back wall hingedly secured to and connecting the rear ends of the side walls, a bottom comprising hingedly connected members, the forward member being hingedly connected to the front wall, and transverse bars secured to the bottom and provided with terminal depending hooks adapted to enter said slots for holding the bottom and side walls in extended relation.

2. A carrier for attachment to a vehicle comprising a front wall, means for securing said wall upon a vehicle, foldable side walls connected to the front wall, a back wall connecting the side walls and having its lower edge provided with an inwardly extending flange having openings therein, a foldable bottom connected to the front wall and latches on said bottom adapted to engage the openings in the flange.

3. A carrier for attachment to a vehicle comprising a front wall, means for securing the front wall to a vehicle, foldable side walls hingedly attached to the front wall and having their upper edges inclined rearwardly and downwardly, said front wall having its upper end extended above the inclined upper edges of the side walls, a rear wall hinged to and connecting the side walls, a foldable bottom hinged to the front wall and provided with means for engaging the side walls and the back wall in extended position, and a cover hinged to the extended end of the front wall and adapted to fit over the upper portions of the side walls, the bottom and the back wall when said parts are in collapsed relation.

4. A carrier for attachment to vehicles comprising a front wall having rearwardly projecting flanges at its side edges, reinforcing plates secured upon the corners of the front wall and extending rearwardly beyond the flanges thereof, side walls consisting of hingedly connected sections, angle bars secured to the lower edges of said side wall sections and provided with slots, the forward sections being hinged to the flanges of the front wall, a rear wall hinged to the rear ends of the rear sections of the side walls and having its lower edge provided with an inwardly extending flange having openings therein, a bottom consisting of hingedly connected sections, the front section being hinged to the front wall, latches carried by the rear bottom section and engaging the openings in the flange of the rear wall, and transverse bars secured to the bottom section and provided with depending hooks adapted to enter the slots in the angle bars of the side walls.

5. In a carrier of the type described, a front wall, side walls consisting of hingedly connected sections, the front sections being hinged to the ends of the front wall, reinforcing members along the lower edges of the sections of the side walls, the reinforcing member on the front section overlapping the rear section whereby to limit the outward movement of the sections, there being spaced slots formed in said reinforcing members, a rear wall hinged to and connecting the rear sections of the side walls, a foldable bottom consisting of hingedly connected sections, the forward section being hinged to the front wall, and reinforcements secured upon the sections of the bottom and provided with terminal depending hooks adapted to engage the slots in the reinforcements on the side walls.

6. A carrier of the type described comprising a front wall, foldable side walls hingedly connected with the front wall and having their upper edge inclined downwardly and rearwardly, the upper edge of the front wall being extended above the upper inclined edges of the side walls, a back wall hingedly connected to the side walls, reinforcing bars secured along the lower edges of the side walls and having slots therethrough, a foldable bottom consisting of hingedly connected sections, the forward section being hinged to the front wall, reinforcements secured on the sections of the bottom and constructed at their ends with depending hooks to engage the slots in the reinforcements on the side walls whereby the bottom will be supported by the side walls and will resist separation of the side walls, and a cover hinged to the extended end of the front wall and resting on the upper inclined edges of the side walls when said side walls are in extended position.

ARDEN A. HANSON. [L. S.]